May 1, 1956  V. F. ZAHODIAKIN  2,743,518
METHOD OF MANUFACTURING A SHEET METAL SOCKET ELEMENT
Filed July 17, 1953  3 Sheets-Sheet 1
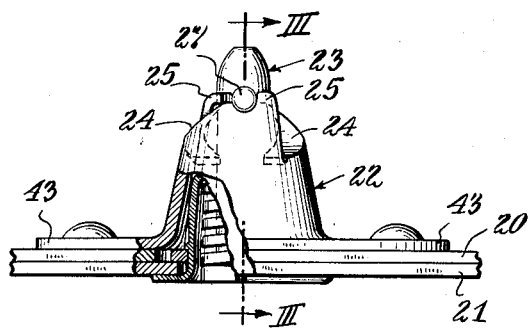
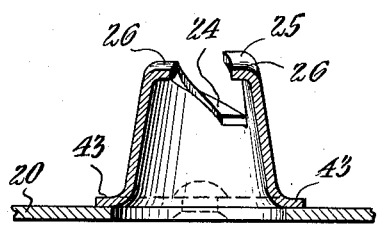
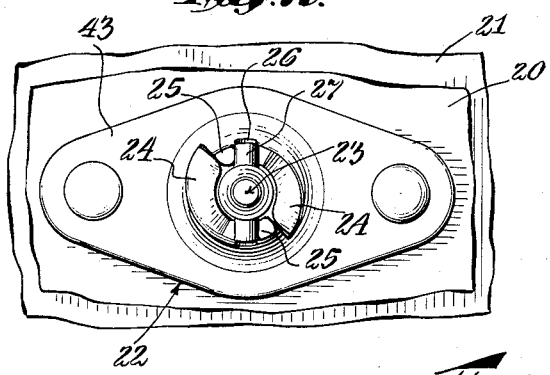
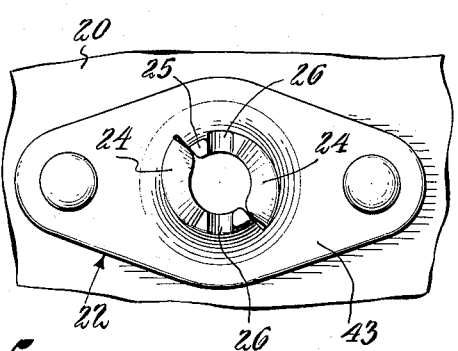
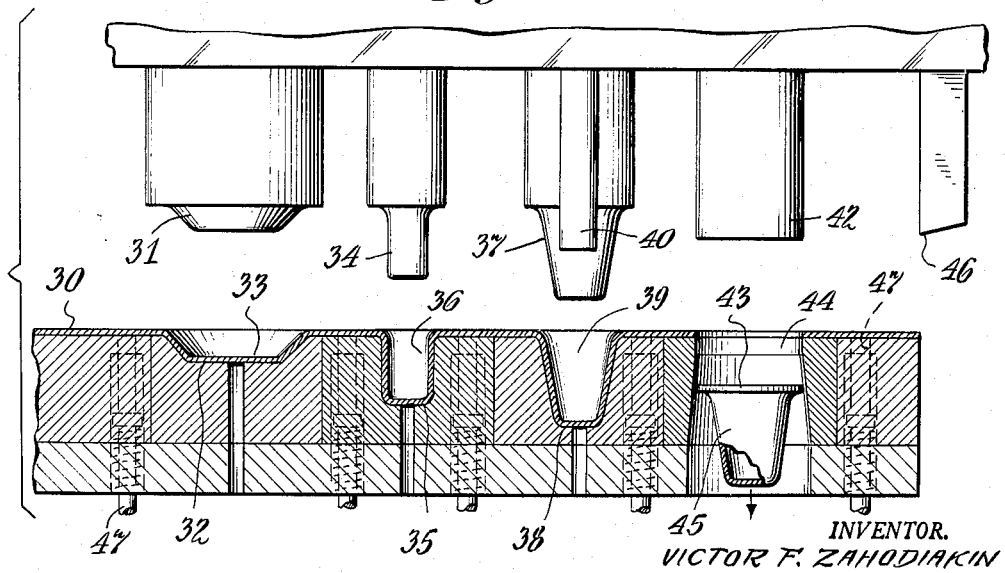
INVENTOR.
VICTOR F. ZAHODIAKIN
BY
Howard P. King
ATTORNEY.

May 1, 1956   V. F. ZAHODIAKIN   2,743,518
METHOD OF MANUFACTURING A SHEET METAL SOCKET ELEMENT
Filed July 17, 1953   3 Sheets-Sheet 2
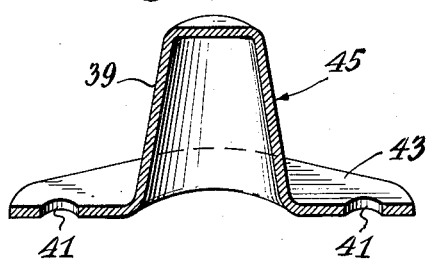
Fig. 6.
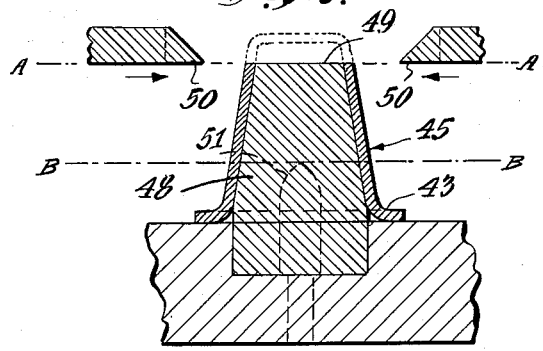
Fig. 7.
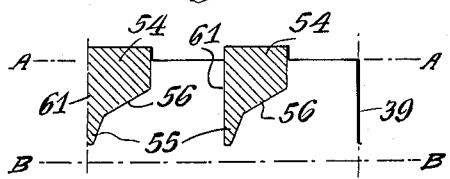
Fig. 8.
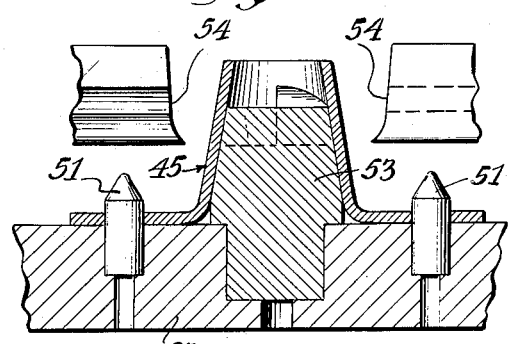
Fig. 9.
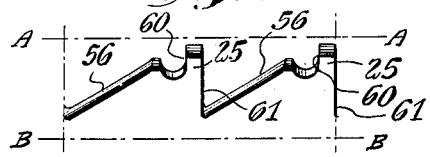
Fig. 11.
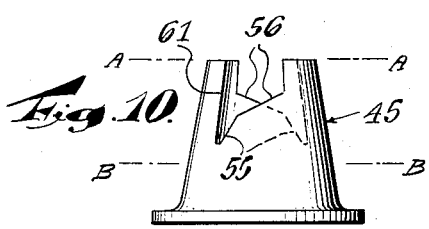
Fig. 10.
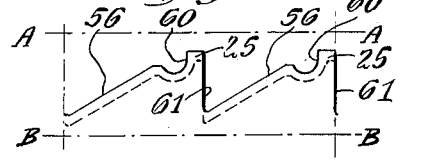
Fig. 14.
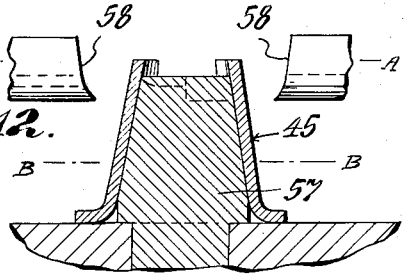
Fig. 12.
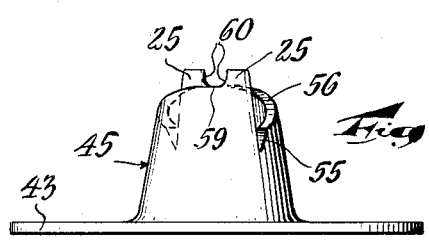
Fig. 16.
Fig. 13.
INVENTOR.
VICTOR F. ZAHODIAKIN.
BY
Howard P. King
ATTORNEY May 1, 1956   V. F. ZAHODIAKIN   2,743,518
METHOD OF MANUFACTURING A SHEET METAL SOCKET ELEMENT
Filed July 17, 1953   3 Sheets-Sheet 3
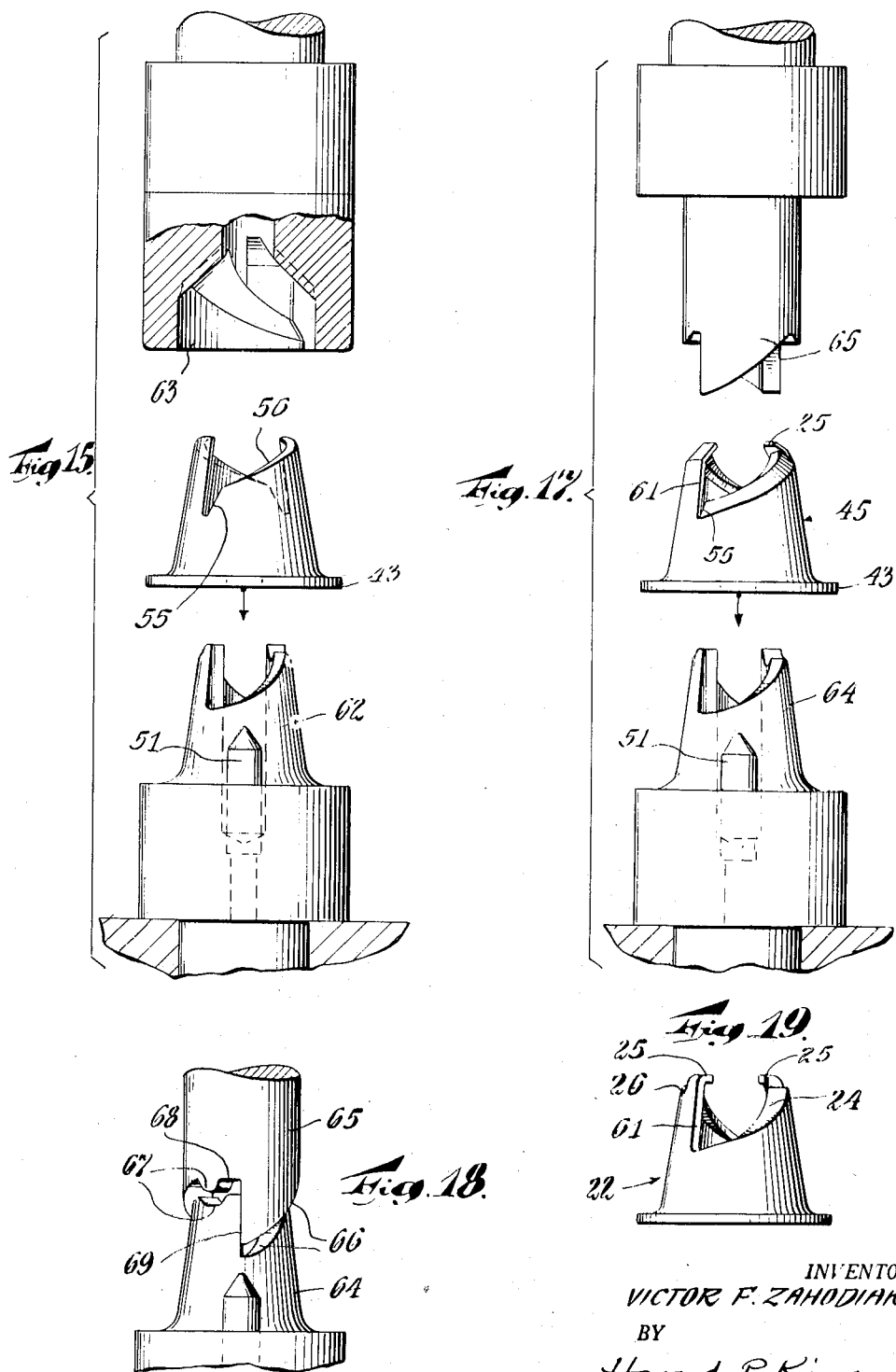
INVENTOR.
VICTOR F. ZAHODIAKIN.
BY
Howard P. King
ATTORNEY.

United States Patent Office 2,743,518
Patented May 1, 1956

2,743,518

METHOD OF MANUFACTURING A SHEET METAL SOCKET ELEMENT

Victor F. Zahodiakin, Summit, N. J.

Application July 17, 1953, Serial No. 368,606

23 Claims. (Cl. 29—539)

This invention relates to method of manufacturing a socket element of sheet metal as a constituent part of a fastening device of the stud and socket type of the character referred to in my prior applications Ser. No. 365,671 filed on or about July 2, 1953, now Patent 2,684,516 issued July 27, 1954.

In general, the fastening device socket element of the mentioned disclosures in said prior application is formed from sheet material and in completed form comprises a basal flange having an upstanding wall from a middle part thereof, said wall being essentially a body of revolution such as cylindrical or frusto-conical and integral with the flange. The far end of said wall from the flange provides in-turned sloping trackways terminating outwardly with stop means preceded in immediate proximity thereto by declivities for stoping rotation and seating the cross-pin of the stud element arranged in use to be introduced and advanced upon said trackways to ultimate seated position in the declivities. The means and method herein set forth are particularly intended for production of a socket element of sheet material, and is capable of producing socket elements of sheet steel adapted to be case carburized to desired depth and hardened to obtain maximum strength and minimum weight, and particularly to provide working surfaces of maximum hardness to prevent usual wear occurring in devices heretofore known and obtaining long, useful life of the socket element, thereby overcoming prior art difficulties.

During a long period of research and development work in connection with formation of such a socket element from sheet material, I have found that construction of such an article cannot be performed by any well-known or common method, due primarily to requirement for deep drawing sharp angles and different and sloping levels and to the relative proportions and size involved and other problems which can not be accomplished by conventional methods. As an outgrowth of my work, I have devised a method and appropriate means by which socket element may be successfully and cheaply made from sheet material inclusive of sheet steel and by which I am enabled to produce a socket of great hardness and strength and light in weight.

In its broad aspect, therefore, the invention contemplates fulfillment of the need for means and method as outlined above.

More specifically, the invention provides for successive operational steps each performing a part of the forming of the material to attain the ultimate construction of socket element.

The invention proposes use of different dies for each of the successive steps and cutting and forming dies operating transverse to the axis of the socket element.

A feature of the invention is to provide means for cutting and bending trackways which each occupy in excess of a quadrant of the curved wall from which they are cut and bent.

Other objects of the invention will appear to persons skilled in the art to which it appertains, both by direct recitation thereof as the description proceeds and by inference from the context.

Referring to the accompanying drawings, in which like numerals of reference indicate similar parts throughout the several views:

Figure 1 is a partially sectioned elevation of a complete stud and socket fastening device mounted in place of use on members showing the sheet metal construction of socket element manufacture of which is contemplated by the present invention;

Figure 2 is a plan of the construction shown in Fig. 1;

Figure 3 is a full sectional view of the socket element mounted in place of use;

Figure 4 is a plan of the construction shown in Fig. 3;

Figure 5 is a view partially in section and partially in elevation showing the dies for triple-drawing the metal and piercing and blanking out the work piece in its general form;

Figure 6 is a perspective section of the work piece as blanked out in Fig. 5;

Figure 7 is a sectional view showing the work piece and dies for performing the next step after blanking out, namely, for cutting end from the drawn cup;

Figure 8 is an approximate developed or flattened out view of the curved surface of the work piece showing dies making a first lateral shaping cut thereinto as the next step in the method;

Figure 9 is a sectional elevation of the work piece and dies in normal relation for effecting said first lateral shaping cuts shown in the developed view of Fig. 8;

Figure 10 is an elevation of the work piece after the first lateral cuts of Figs. 8 and 9 have been made;

Figure 11 is an approximate developed or flattened out view similar to Fig. 8 and showing a second lateral cut made in the work piece;

Figure 12 is a view similar to Fig. 9, showing the work piece and dies in normal relation for effecting the said second shaping cut;

Figure 13 is an elevation of the work piece after said second lateral shaping cut has been made;

Figure 14 is a further approximate developed view of the work piece showing subsequent and first of successive bending steps made upon the marginal edges created by the said first and second cuts;

Figure 15 is an elevational section of the dies for effecting said first of said bending steps and showing the work piece aligned between the dies as it appears before being bent thereby;

Figure 16 is another approximate developed view of the work piece showing the second of the successive bending steps made upon said marginal edges to bring them to final position;

Figure 17 is an elevational section similar to Fig. 15 showing the work piece as previously partially bent by the first bending step aligned between dies for the second bending step;

Figure 18 shows in elevation the dies for said second bending step in their cooperating relation at position of completing said second bend, but without showing the work piece therebetween; and Figure 19 is an elevation of the work piece as having received said second and final bend.

For a full understanding of the invention, I will first briefly explain the fastening device whereof the socket element, manufacture of which is the subject matter of this disclosure, constitutes an essential part. Said device is of the stud and socket type for clamping together two members 20, 21 such as panels or plates or other parts, particularly of airplanes. The socket element, designated generally by reference numeral 22 is fixed upon one member, as 20, whereas a stud element 23 is mounted to be retained by the other member 21 and insertable into the socket element. The socket element provides inturned sloping trackways 24 terminating with stops 25 immediately preceded by declivities 26. The stud element is spring loaded and provides a cross-pin 27 adapted to be advanced up the trackways and seat in said declivities and by virtue of the relationship of the stud and socket elements and spring loading, effects a clamping of the members together. Heretofore, it has been necessary to die-cast the socket element and the resultant structure has been unavoidably weighty and inaccurate and with poor wear surfaces, short life and insufficient strength for some loads desired to be put upon them.

According to the present invention, the disclosed method is one by which sheet metal stock may be advanced a step at a time through a bank of dies and be successively drawn into a deeper and deeper cup formation and have holes pierced in its flange, and finally the cup-shaped piece with said flange integral therewith is cut from the stock to constitute the work piece upon which subsequent operations are performed as will be more fully described hereinbelow. For the high standard specifications required by the Government, to obtain specific strength, minimum weight commensurate with the attained strength, tough wear surfaces, dimensional accuracy and other characteristics, I prefer to employ a low carbon content steel, such as that known in the trade as SAE 1020 or SAE 1018, or any other suitable steel of reasonably low carbon content and which is suitable for drawing operations as herein disclosed and which meets the requirements of hardness and strength. However, there are numerous instances, especially outside of warcraft requirements, where less tensile strength is needed, and consequently the invention is not limited to steel alone, but other materials, such as sheet aluminum, may be used to gain the benefit of its lightness. An advantage of the specified steel lies not only in its inherent strength, but also in its capability of being case hardened, and I take advantage of this characteristic by case hardening the socket element after the same is completely formed.

In the specific embodiment of the invention as illustrated in the accompanying drawings, and referring initially to Fig. 5, plural-step drawing of the metal stock 30 is effected by dies arranged in successive male and female pairs and here shown as three pairs of drawing dies of which the first pair provides an upper male die 31 and lower female die cavity 32 thereunder and of cooperating shape for effecting a drawing of the stock as a wide shallow cup 33. Then the metal stock is lifted to raise the cup from the female die, and the stock advanced to move the shallow cup in axial alignment with a second male die 34 and over the cooperating second female die cavity 35 which is deeper and of less diameter than the first. Operation of the dies will then draw the shallow cup into the form of a deeper cup 36. Again the stock is advanced to move said deeper cup in axial alignment with a third forming male die 37 which in this instance has a shape corresponding to the desired final shape of cup to be drawn. The female die cavity 38 for this third male die has corresponding shape thereto so that upon operation of the dies, the metal is given a predetermined final form of cup 39 which in this instance is frusto-conical, although other shapes are contemplated as appears in said copending application. Associated with this third operational step and at opposite sides of the respective male die 37 and female die cavity 38 are punches 40 for forming rivet holes 41 in the flat or flange portion of the stock. In subsequently described operations, these rivet holes serve a useful purpose of orienting the work piece, and in the finished device, serve as rivet holes for mounting purposes. Once again, the stock is advanced and the fully drawn cup brought axially under the severing male die 42 and over a corresponding female die through cavity 44 having cutting edges in the shape of the desired contour of the flange 43 of the socket element. Operation of the dies severs the flanged work piece 45 from the stock as shown done and the work piece drops through the female die cavity ready for subsequent individual operations thereon.

The several pairs of dies above described are preferably operated simultaneously and are axially evenly spaced so that four work pieces are in process of formation with each operation of the bank of dies. The stock is in strip form and may be cut off after passing the location of the work-piece severing dies, as by a cutter 46 which thereby reduces the blanked out stock to small scrap. Lifting of the stock between each depression of the male dies may be suitably effected as by means of appropriately placed spring loaded pins or lifting plungers 47.

One of the work pieces 45 drawn, punched and severed in accordance with the foregoing description is shown in section in Fig. 6. For convenience in the following description, the work piece will be considered as having its flange 43 at the bottom and the cup 39 inverted. Considered thus oriented, the work piece 45 is placed upon a fixed mandrel 48 the side surface whereof fits snugly within the upstanding side wall of the cup, and the upper end face 49 of the mandrel is perpendicular to the axis at a distance below the inverted bottom wall of the cup. Opposite shearing cutters 50 with shearing edges substantially in the plane of the top face 49 of the mandrel are movable toward each other and cooperate with said face in effecting a shearing removal of the closing end of the cup, rendering the same open so that only the flanged upstanding wall remains. The sheared or upper edge of said upstanding wall is in a plane A—A perpendicular to the axis of said wall.

The work piece 45, with top thereof shorn by the operation last described, appears in Fig. 9 oriented by pins 51 on a die holder 52, and a fixed die 53 projects upwardly into the hollow of the upstanding wall with snug fit therein. At two sides of the fixed die and work piece, directly opposite each other, are two lateral punches 54, hereinafter distinguished by the more specific identification calling them the first lateral punches. These punches are opposed each to substantially a quadrant of the upstanding wall and are movable with the center line of the two punches coincident with a single diameter of the said wall. These first lateral punches, in cooperation with the inner fixed die, function to punch a downward gash 55 in opposite sides of the upstanding wall as indicated in Fig. 8. Above the gash 55, the side wall is punched or sheared angularly upward, as at 56 (as shown in Fig. 8), the angle being that desired for the advancing trackway in the final product. The depth of the gash below the intercepting edge of this angular cut substantially represents the desired radial width of the ultimately formed trackway, but as so far processed, the material is not yet bent to form said trackway. The work piece as so far formed is shown in Fig. 10. It will be noted that the angular upward cut 56 rises about half way only from the level of the top of the gash 55 toward the top edge of the work piece at plane A—A.

The next operation is to complete the angular cut and at the same time provide a projection to ultimately constitute a stop in the socket element. To do this, the work piece is again oriented upon a second fixed die 57 (as shown in Fig. 12) with a second two lateral punches 58 opposite the work piece and with the work piece rotated substantially 90° from its previously punched position, so that these second lateral punches are opposite the quadrants of the work piece not previously punched. These second lateral punches move inwardly on a common diameter of the work piece and punch a continuation of the angular upward cut 56 of the first two punches (as shown in Fig. 11). The die and punches of this second set are shaped to cut a horizontal edge 59 parallel to and below plane A—A intercepting the sloping cut 56 before said sloping cut reaches said plane. The other end of the horizontal edge cut 59 is terminated by a vertical cut 60 which will ultimately constitute stop 25 of the socket element. Closely following this vertical cut 60, which is rounded at its bottom to merge with the horizontal cut 59, is a deep vertical cut 61 to the bottom of the gash 55, this cut having been made previously by the first lateral punch. The work piece as so far formed is shown in Fig. 13, all preforming cutting now being complete.

Next, the work piece is subjected to bending operations, which are done in two stages, first bending the margin next to the sloping or angular cut 56 and next to the horizontal cut 59, as shown in Fig. 11, inwardly at approximately 45° to the axis of the upstanding wall and then again inwardly another 45° to be radial to said axis. Figures 15 and 17 are illustrative of these bending steps respectively. The amount of material bent over is made sufficient so that its inwardly directed edge will form a cylindrical surface of appropriate size to receive the stud 23.

In Figure 15 a lower fixed die 62 is shown with associated pins 51 as with previously described fixed dies for orienting the work piece thereon. The upper edge of this fixed die conforms to the shape desired for the trackway and declivity. The upper die 63 conforms to the profile of the lower die, but with an approximately 45° angle for effecting the partial inward bending of the above-mentioned margins of the work piece. After those bends are made, the work piece is transferred to oriented position upon a final fixed die 64 shown in Fig. 17, and as this die provides upper surfaces perpendicular to the axis, the said margins of the work piece are bent inward by cooperation of a conformed upper die 65 to final desired position forming sloping trackways 24 perpendicular to the axis terminating upwardly in radial declivities 26 and upwardly projecting stops 25. At the convex side of the bend, the metal will draw and thereby provide a bevel at the corner edge. Figure 18 is illustrative of the cooperative relationship of the bending dies wherein said dies have slope forming end edges 66, declivity forming edges 67, and stop-bending edges 68. Said dies have long vertical edges 69 which ride contiguous to each other and prevent twisting of the dies as they close upon the metal of the work piece. This feature is present in the dies of both Figs. 15 and 17 and the exemplification in Fig. 18 thereof with respect to the dies 64 and 65 is deemed equally illustrative as effective in Fig. 15 without repetitious showing.

The several operations subsequent to shearing the end from the work piece are illustrated by the developed views of Figs. 8, 11, 14 and 16. In Figure 8 the initial lateral punching operation is indicated as making the gashes 55 and lower end portion of the upward sloping cuts 56, in two quadrant areas in 180° opposition. Figure 11 is illustrative of the second lateral punching, completing the sloping cuts 56 and making the horizontal and vertical cuts 59 and 60 respectively in the other two quadrant areas. Figure 14 is illustrative of the next step of bending the margins next to the mentioned cut edges inwardly at approximately 45°, and Figure 16 shows those bends completed to substantially 90° disposition to the adjacent surface of the upstanding wall. In view of the inward bend of the stops 25, it will be observed that the height of the top of the socket element as finally bent is somewhat below plane A—A, as shown in Fig. 7, which designated the original height, when sheared.

Following the above-described operations, the formed work piece may be bored to remove rough or irregular edges so that, viewed endwise, the work piece, or now fully forced socket element, will have a substantially circular opening therethrough defined by the inwardly projecting edges of the bent-in margins and thus in appropriate condition to receive a stud 23 in use. In addition, to thus boring the device, it may be tumbled in a well-known manner to remove other sharp edges or metal projections. Finally, for those devices made of steel and to obtain increased strength, case carburizing and hardening is performed thereon. In many instances it is also desirable to electroplate the socket element by such materials as cadmium or chromium to prevent corrosion and augment resistance to deleterious action of salt water.

While I have described a preferred method in considerable detail for carrying out my generic concept, various changes from the specific disclosure may be made without departing from the spirit or scope of the invention.

I claim:

1. A process of forming socket elements from sheet material, comprising drawing metal to cup shape thereby forming an upstanding wall symmetrical about an axis, shearing the end of said wall on a plane perpendicular to said axis, and slicing off a further section of said wall by a cutter moving in a direction perpendicular to said axis and with the cutting edge of the cutter at an angle to said plane thereby producing a top edge portion of the upstanding wall sloping progressively forward thereof.

2. A process of forming socket elements from sheet material, comprising drawing metal to a flanged cup shape thereby forming an upstanding hollow wall from the flange symmetrical about an axis, shearing the end of said wall on a plane perpendicular to said axis, and slicing off diametrically opposite sections of said wall by cutters moving inwardly in directions perpendicular to said axis from opposite sides of said upstanding hollow wall and with the cutting edges of the cutters oppositely inclined to each other.

3. A process of forming socket elements from sheet material, comprising drawing metal to cup shape thereby forming an upstanding wall symmetrical about an axis, and successively cutting off adjacent sections of said upstanding wall by first and second cutters each moving in a direction perpendicular to said axis and each having its cutting edge sloping transversely of said axis, each cutter producing a top edge portion of the upstanding wall sloping progressively forward, and the second cutter effecting a continuation of the top edge portion cut made by the first cutter.

4. A process of forming socket elements from sheet material, comprising drawing metal to cup shape thereby forming an upstanding wall symmetrical about an axis, and successively cutting off adjacent sections of said upstanding wall by first and second cutters each moving in a direction perpendicular to said axis and each having its cutting edge sloping transversely of said axis, each cutter producing a top edge portion of the upstanding wall sloping progressively forward and the second cutter effecting a continuation of the top edge portion cut by the first cutter and at the same angle at said top edge portion as the cut of the first cutter.

5. A process of forming socket elements from sheet material, comprising drawing metal to cup shape thereby forming an upstanding wall integral with a flange, cutting off and upper section of said wall on one line extending from the upper end of said wall and sloping downwardly at an angle transverse to said wall and on another line extending longitudinally of said wall and intersecting the sloping line, and cutting a gash longitudinally of said wall said gash being in continuation of said longitudinal cutting of the wall and projecting from and below the bottom end of said sloping cut.

6. A process of forming socket elements from sheet material, comprising drawing metal to cup shape thereby forming an upstanding wall integral with a flange, cutting off an upper section of said wall on one line extending from the upper end of said wall and sloping downwardly at an angle transverse to said wall and on another line extending longitudinally of said wall and intersecting the sloping line, cutting a gash longitudinally of said wall said gash being in continuation of said longitudinal cutting of the wall and projecting from and below the bottom end of said sloping cut, and bending over the margin below said sloping line to the depth of said gash.

7

7. A process of forming socket elements from sheet material, comprising drawing metal to cup shape thereby forming an upstanding wall integral with a flange, cutting off an upper section of said wall on one line extending from the upper end of said wall and sloping downwardly at an angle transverse to said wall and on another line extending longitudinally of said wall and intersecting the sloping line, cutting a gash longtudinally of said wall in continuation of said longitudinal cutting of the wall and projecting downwardly below and from the bottom end of said sloping cut, and bending over the margin below said sloping line to the depth of said gash with two stages of bending.

8. A process of forming socket elements from sheet material, comprising drawing metal to cup shape thereby forming an upstanding wall integral with a flange, cutting off an upper section of said wall on one line extending from the upper end of said wall and sloping downwardly at an angle transverse to said wall and on another line extending longitudinally of said wall and intersecting the sloping line, cutting a gash longitudinally of said wall in continuation of said longitudinal cutting of the wall and projecting downwardly below and from the bottom end of said sloping cut, and bending over the margin below said sloping line to the depth of said gash with two stages of bending of which the first bending is to approximately 45° and the second substantially to 90°.

9. The process of forming a socket for a fastening device from a strip of thin flexible sheet material consisting of drawing a socket element, punching on a slope toward an end of said element to remove excess material and leaving a margin of material between end cuts to the sloping cut, and bending said margin perpendicularly inward parallel to the slope cut thereby forming a spirally sloping trackway perpendicular to the socket element axis and of greater width of material than thickness thereof for a cross pin to ride upon in use.

10. The process of forming a socket for a fastening device from a strip of flexible sheet material, comprising drawing operations to form a hollow body upstanding from a flange, removing excess metal from the body and leaving sufficient border in an angular direction for bending laterally to form a trackway, and bending said border substantially at right angles to the axis of said body, and simultaneously forming declivities at an end of said border and trackway.

11. The process of forming a socket for fastening device from a strip of flexible sheet material, comprising drawing operations to form a hollow body upstanding from a flange, removing excess metal from the body and leaving sufficient border in an angular direction for bending laterally to form a trackway and center hole for fitting a stud element in use, and bending said border substantially at right angles to the axis of said body, and boring the inturned edges of said trackway.

12. The process of forming a socket for fastening devices from a strip of flexible sheet material, comprising drawing operations to form a hollow body upstanding from a flange, removing excess metal from the body and leaving sufficient border in an angular direction for bending laterally to form a trackway, and bending said border substantially at right angles to the axis of said body, and simultaneously forming declivities at an end of said border and trackway and boring the inturned edges of said trackway and declivities.

13. The process of forming a socket for a fastening device from a strip of flexible sheet material, comprising drawing operations to form a hollow body upstanding from a flange, punching the material forming the flange with holes for attaching the flange in place of use, removing excess metal from the body and leaving sufficient border in an angular direction for bending laterally to form a trackway, and bending said border substantially at right angles to the axis of said body, boring the inturned edges of said trackway, and case carburizing and hardening the same.

14. The process of forming a socket for a fastening device from sheet metal comprising drawing the metal with plural drawing steps to a fully drawn frusto-conical socket body and upstanding from a flat portion of said metal, blanking out a flange around said body, shearing and cutting the body to provide sloping edges at the end remote from said flange, and forming spiral trackways from the margins of metal next to said sloping edges.

15. The process of forming a socket for a fastening device from sheet metal comprising drawing the metal with plural drawing steps to a fully drawn frusto-conical socket body and upstanding from a flat portion of said metal, blanking out a flange around said body, shearing and cutting the body to provide sloping edges at the end remote from said flange, and making successively a partial bend and a complete bend of margins of the metal next to said sloping edge effecting a final bend of 90° to the axis thereby forming trackways from said margins having corresponding slope to the slope of said edges.

16. The process of forming a socket for fastening device from sheet metal comprising drawing the metal with plural drawing steps to a fully drawn frusto-conical socket body and upstanding from a flat portion of said metal, blanking out a flange around said body, shearing and cutting the body to provide sloping edges at the end remote from said flange, and making successively a partial bend and a complete bend of margins of the metal next to said sloping edge effecting a final bend of 90° to the axis thereby forming trackways from said margins having corresponding slope to the slope of said edges, and projecting said trackways inwardly of the socket body with the lower ends thereof unobstructed therein for allowing a cross-pin in use to enter thereon from the interior to the exterior of said trackways.

17. The process of forming a socket for a fastening device from a strip of sheet metal comprising die-forming a flange and hollow frusto-conical body as an integral work piece, and removing excess metal from said work piece, and forming spiral trackways perpendicular to the axis of the frusto-conical wall from margins of the retained metal by bending and setting said margins in a final disposition radial to said hollow body.

18. A process of forming a socket element for a fastening device from a strip of sheet metal, comprising forming a frusto-conical wall upstanding from a flange, and punching said wall with dies making sloping cuts up said wall and making gashes next to the bottom of said sloping cuts to define a line of bending from the bottoms of the gashes, and bending the margins of material above the bottom lines of the gashes and making said bends parallel to the slopes of said sloping cuts, perpendicular to the axis of the frusto-conical wall, said gashes making bottom ends to the said trackways.

19. A process of forming a socket element for a fastening device from a strip of sheet metal, comprising forming a wall upstanding from a flange, punching said wall with dies making sloping cuts up said wall, inserting a die within the hollow of said upstanding wall and having slopes corresponding to but lower than said sloping cuts, and forcing the marginal metal next to said cuts inwardly onto the slopes of said die and thereby forming spiral trackways of constant thickness from the underside to the top side thereof whereby the under and top surfaces of said trackways are parallel.

20. The process of forming a socket from a resilient sheet metal for a fastening device consisting of a plurality of dies to form said socket including shearing and piercing dies to remove excess metal and providing a metal margin for forming trackways, said trackways being formed as spirals against external edges of a die which substantially conform in configuration to correspond to said trackway formation, and said external edges of the die having substantially sharp corners to prevent flow of metal downwardly during formation of the bevel from which trackways are formed.

21. The process of forming a socket from a resilient sheet metal for a fastening device consisting of a plurality of dies to form a flange and hollow frusto-conical body and remove excess metal from the sides from which spiral trackways will be formed including an internal die and an external beveling die corresponding to said internal die to provide predetermined bevel of sufficient width to provide sufficient width of spiral trackways and including upper and lower dies for setting the bevel and providing the trackway surfaces substantially at right angles with the axis of the socket, said lower die having upper surfaces corresponding to configuration of the internal surfaces of the trackways and said upper die having contacting surfaces which are substantially of identical configuration of the lower die surfaces on which tracks are being formed, and said upper die under impact and pressure forcing the bevel against the die surfaces and forming external surfaces of the trackways substantially at right angles with an axis of the socket.

22. The process of forming a socket from a resilient sheet metal for a fastening device consisting of a plurality of dies to form a flange and hollow frusto-conical body and remove excess metal from the sides from which spiral trackways will be formed including an internal die and an external beveling die corresponding to said internal die to provide predetermined bevel of sufficient width to provide sufficient width of spiral trackwaye and including upper and lower dies for setting the bevel and providing the trackway surfaces substantially at right angles with the axis of the socket, said lower die having upper surfaces corresponding to configuration of the internal surfaces of the trackways and said upper die having contacting surfaces which are substantially of identical configuration of the lower die surfaces on which tracks are being formed, and said upper die under impact and pressure forcing the bevel against the die surfaces and forming external surfaces of the trackways substantially at right angles with an axis of the socket, and forming each trackway with its internal and external surfaces substantially parallel.

23. The process of forming a socket for a fastening device from a strip of thin sheet material consisting of drawing a socket element, punching on a slope toward an end of said element to remove excess material and leaving a margin of material between end cuts to the sloping cut, and bending said margin inward parallel to the slope cut thereby forming a spirally sloping trackway of greater width of material than thickness thereof for a cross-pin to ride upon in use, and making said bend with a radial dimension of trackways uniformly increasing toward the flange for providing riding surfaces for the cross-pin converging inwardly in advancing direction.

References Cited in the file of this patent
UNITED STATES PATENTS

| | | |
|---|---|---|
| 950,524 | Whytock | Mar. 1, 1910 |
| 2,017,421 | Post | Oct. 15, 1935 |
| 2,093,104 | Veale | Sept. 14, 1937 |
| 2,239,125 | Summers | Apr. 22, 1941 |
| 2,244,976 | Tinnerman | June 10, 1941 |
| 2,610,390 | Locke | Sept. 16, 1952 |